US010019888B2

(12) United States Patent
Bonner

(10) Patent No.: US 10,019,888 B2
(45) Date of Patent: Jul. 10, 2018

(54) WEATHER-BASED REMINDERS

(71) Applicant: Apple Inc., Cupertino, CA (US)

(72) Inventor: Matthew R. Bonner, Portland, OR (US)

(73) Assignee: APPLE INC., Cupertino, CA (US)

(*) Notice: Subject to any disclaimer, the term of this patent is extended or adjusted under 35 U.S.C. 154(b) by 277 days.

(21) Appl. No.: 13/749,624

(22) Filed: Jan. 24, 2013

(65) Prior Publication Data

US 2014/0203940 A1 Jul. 24, 2014

(51) Int. Cl.
| | | |
|---|---|---|
| *F21S 10/04* | (2006.01) | |
| *G08B 1/08* | (2006.01) | |
| *G08B 21/24* | (2006.01) | |
| *H04W 4/021* | (2018.01) | |

(52) U.S. Cl.
CPC ............ *G08B 21/24* (2013.01); *H04W 4/021* (2013.01)

(58) Field of Classification Search
CPC ........ G06Q 10/10; G06Q 10/06; G06Q 30/02; G06Q 40/08; G08B 21/10; H04H 20/59; H04L 67/18; H04L 67/306; H04N 21/47214; H04N 21/814; H04W 4/02; H04W 4/22; H04W 4/021; H04W 4/06; H04W 4/12; H04W 76/007; G06F 17/30867; G08G 5/0021
USPC ........... 340/601, 540, 905; 455/404.1, 404.2, 455/456.3, 466; 709/206, 217; 702/3; 705/14.64; 725/33
See application file for complete search history.

(56) References Cited

U.S. PATENT DOCUMENTS

| | | | | |
|---|---|---|---|---|
| 6,404,880 | B1 * | 6/2002 | Stevens | 379/221.11 |
| 6,823,263 | B1 * | 11/2004 | Kelly et al. | 702/3 |
| 8,599,013 | B1 * | 12/2013 | Baron, Sr. | 340/539.28 |
| 8,712,027 | B2 * | 4/2014 | Sutcliffe | 379/207.16 |
| 8,779,917 | B1 * | 7/2014 | White | 340/539.11 |
| 2004/0064585 | A1 * | 4/2004 | Doss et al. | 709/246 |
| 2004/0192311 | A1 * | 9/2004 | Koskinen et al. | 455/440 |
| 2006/0142944 | A1 | 6/2006 | Orwant | |
| 2006/0218029 | A1 | 9/2006 | Chin | |
| 2009/0295587 | A1 * | 12/2009 | Gorman, Jr. | 340/601 |
| 2010/0026526 | A1 | 2/2010 | Yokota | |
| 2010/0049815 | A1 * | 2/2010 | Vanecek et al. | 709/206 |

(Continued)

FOREIGN PATENT DOCUMENTS

WO WO 2014/116389 7/2014

OTHER PUBLICATIONS

International Search Report and Written Opinion for PCT/US2013/077727, dated Jul. 25, 2014, Apple Inc.

*Primary Examiner* — Quan-Zhen Wang
*Assistant Examiner* — Stephen Burgdorf
(74) *Attorney, Agent, or Firm* — Fletcher Yoder PC

(57) ABSTRACT

Some embodiments provide a reminder application for creating and displaying weather-based reminders. The reminder application provides a set of tools to create a reminder and associate the reminder with a weather condition for a location. To present a weather-based reminder, the reminder application of some embodiments identifies a reminder associated with a weather condition for a location. The application then retrieves weather data for that location. After retrieving the weather data, the application then compares the weather data with the weather condition. When the weather data satisfies the weather condition, the application presents the reminder.

6 Claims, 14 Drawing Sheets

(56) References Cited

U.S. PATENT DOCUMENTS

| | | |
|---|---|---|
| 2010/0167712 A1 | 7/2010 | Stallings et al. |
| 2012/0077463 A1 | 3/2012 | Robbins et al. |
| 2012/0150446 A1* | 6/2012 | Chang et al. .............. 702/3 |
| 2013/0346523 A1* | 12/2013 | Praun et al. ............. 709/206 |
| 2014/0114624 A1* | 4/2014 | Buchanan et al. ........... 703/2 |
| 2015/0256277 A1* | 9/2015 | Johnson ............. H04L 51/14 |
| | | 340/601 |

\* cited by examiner

WEATHER-BASED REMINDERS

BACKGROUND

Many applications are available today to provide reminder services. Present reminder services include simple notes reminding users based on date and time. For example, a typical reminder application can be configured to provide a note at a specified time (e.g. "It's 7:00 AM, time to wake up"). In addition, reminder applications have been implemented on a variety of different computing devices (e.g., desktops, laptops, tablet devices, smartphones, etc.). However, prior art reminder applications have yet to leverage the full spectrum of information available to the computing devices.

SUMMARY

Embodiments of a reminder application for creating and displaying weather-based reminders are described herein. The reminder application provides a set of tools to create a reminder and associate the reminder with a weather condition (e.g., windy, cold, cloudy, rainy, snowy, thunderstorms, etc.) for a location. Once the reminder is created, the application presents the reminder when the weather data for that location satisfies the weather condition. The reminder may be presented in any number of different ways. For instance, the application of some embodiments displays a notification on a device, causes the device to play a sound, causes the device to vibrate, and/or instructs another application to perform an action.

To present a weather-based reminder, the reminder application of some embodiments identifies a reminder associated with a weather condition for a location. The application then retrieves weather data for that location. The weather data may be retrieved from a weather information source (e.g., weather forecast service) using location data (e.g., Global Positioning System data). Alternatively, the weather data may be retrieved locally from the device's storage if the weather data has been previously downloaded from the weather information source.

The computing device of some embodiments includes sensors that allow for different kinds of observation of weather conditions. In such cases, the reminder application can use the device hardware (e.g. thermometer, barometer, humidity sensor, wind sensor etc.) to gather weather data. After retrieving the weather data, the reminder application compares the weather data with the weather condition. When the weather data satisfies the weather condition, the application presents the reminder. In some embodiments, the weather data can satisfy weather conditions through fuzzy logic. For example, an amount of rainfall as measured in inches or centimeters can be rounded up or down to the nearest whole unit of measurement. Alternatively, in another example, a requirement of a particular amount of rainfall or particular temperature could accept some variance above or below the required conditions to account for variations in weather readings. For example, the reminder application might consider temperature values plus or minus some delta to allow for variations between the weather-reading location and another location (e.g., a family member's house).

In some embodiments, the reminder application considers one or more other factors when presenting the reminder. That is, in addition to the weather condition, the reminder might be associated with one or more other conditions, such as temperature, date and time, a location, a pressure level, humidity, pollution level, dew point, airborne allergen conditions, etc. For instance, the reminder may be associated with a rainy weather condition, and a date and time value. In such a case, the reminder application might check one condition, iterate to a next condition, and check the next condition. When one or more of those conditions are satisfied, the reminder application displays the reminder. In some embodiments, a weather condition is based on a change in weather conditions. For instance, a reminder may be created that alerts the user if the barometric pressure drops more than a specified amount (e.g., drops more than a specified number of millibars) or that alerts the user to add water to a cat bowl if the temperature rises more than 20 degrees.

In some embodiments, the reminder application allows its user to create a new weather-based reminder using voice control. For instance, the user can add a new reminder by talking into a microphone attached to the computing device on which the reminder application executes. To facilitate the voice control, the reminder application of some embodiments interfaces with a speech recognition program. The speech recognition program of some embodiments executes on the computing device to act as an intelligent personal assistant for the user.

Several more detailed embodiments of the invention are provided below. Many of these examples refer to controls (e.g., selectable items) that are part of the reminder application. The reminder application of some embodiments is part of a standalone application that executes on top of the operating system of a device, while in other embodiments the reminder application is part of the operating system. Also, in many of the examples below (such as those illustrated in FIGS. 1, 3-5, and 7-10) the device on which the application executes has a touch screen through which a user can interact with the reminder application. However, one of ordinary skill in the art will realize that cursor controllers or other input devices can be used to interact with the controls and applications shown in these examples for other embodiments that execute on devices with cursors and cursor controllers or other input mechanisms (e.g., voice control, remote control).

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a reminder application for creating and displaying weather-based reminders. The reminder application provides a set of tools to create a reminder and associate the reminder with a weather condition for a location. Examples of such a weather condition include windy, cold, cloudy, rainy, snowy, thunderstorms, dry conditions, etc. Once the reminder is created, the application presents the reminder when the weather data for that location satisfies the weather condition. The reminder may be presented in any number of different ways. For instance, the application of some embodiments displays a notification on a device, causes the device to play a sound, causes the device to vibrate, and/or instructs another application to perform an action.

To present a weather-based reminder, the reminder application of some embodiments identifies a reminder associated with a weather condition for a location. The application then retrieves weather data for that location. The weather data may be retrieved from a weather information source (e.g., weather forecast service) using location data (e.g., Global Positioning System data). Alternatively, the weather data may be retrieved locally from the device's storage if the weather data has been previously downloaded from the weather information source. After retrieving the weather data, the reminder application compares the weather data with the weather condition. When the weather data satisfies the weather condition, the application presents the reminder. In some embodiments, the weather data can satisfy weather conditions according to fuzzy logic. For instance, a requirement of a particular amount of rainfall or particular temperature could accept some variance above or below the required conditions to account for variations in weather readings.

Figure 1:
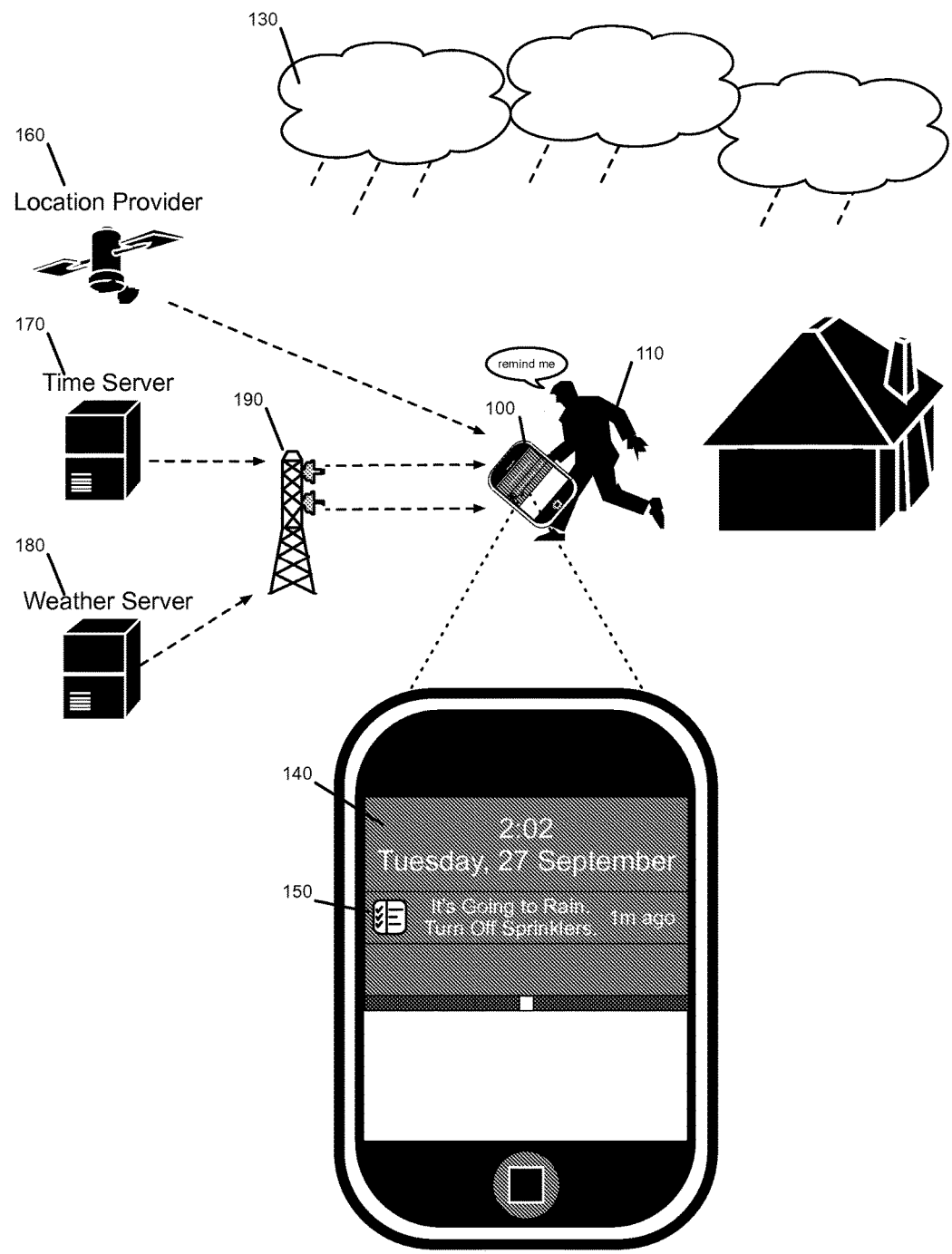
FIG. 1 conceptually illustrates an example of displaying a notification based on a weather-based reminder.

For some embodiments of the invention, FIG. 1 conceptually illustrates an example of displaying a notification based on a weather-based reminder. Specifically, this figure illustrates how a reminder application 140 presents a notification when the weather data retrieved from a weather server 180 satisfies a weather condition associated with the reminder. As shown, the figure includes a computing device 100 that executes the reminder application 140. The figure also illustrates an information network that provides weather, time, and location data to the computing device 100. To simplify the discussion, the information network only includes a location provider 160, a time server 170, a weather server 180, and a communication infrastructure 190. However, the information network may include other components and/or may include multiple different networks such as a cellular network (e.g., 4G network, LTE network) and a Wi-Fi network.

As shown FIG. 1, the computing device 100 is a portable device (e.g., smart phone, tablet) that executes the reminder application 140. Alternatively, the reminder application 140 may execute on stationary devices (e.g., desktop computers, smart televisions, digital media receivers) or any other computing devices capable of receiving weather information. Here, the computing device 100 includes network connectivity hardware to receive information from the location provider 160. The computing device 100 also includes network connectivity hardware to receive information using the communication infrastructure 190. In some embodiments, the network connectivity hardware includes a Global Positioning System ("GPS") receiver for receiving satellite-based location information from the location provider 160. In some embodiments, the network connectivity hardware of the computing device 100 includes at least one of a cellular radio transceiver, a Bluetooth transceiver, and a Wi-Fi transceiver for receiving cellular, Bluetooth, or wireless data from the communication infrastructure 190.

The location provider 160 provides the computing device 100 with GPS signal that identifies its current location. For instance, the GPS signal can include longitudinal, altitudinal, and latitudinal coordinates. The reminder application of some embodiments identifies the location of the device based on the coordinates that the computing device receives at its location. Instead of or in conjunction with the GPS signal, the reminder application uses other methods (e.g., cell tower triangulation) to estimate the current location.

Different from the location provider, the time server 170 provides the current date and time to the computing device 100. This time server 170 is an optional component that is used check whether the computing device 100 is operating with the correct date and time. That is, the computing device 100 might strictly use its internal clock and not synchronize its time data with the time server 170.

The weather server 180 provides weather information to the computing device 100. The reminder application 140 uses the weather information to trigger a reminder associated with one or more weather conditions. The weather information provided by the weather server may not reflect the actual weather. Rather, the weather information will reflect a weather report or a weather forecast. For example, the weather information may include a code or a text string that identifies a weather forecast for a particular day at a particular location. In some cases, the weather information may include multiple different codes that identify what the weather forecast is at different times (e.g., at each hour) during the day. The weather information may also include multiple codes that identify what the weather forecast is for multiple different days (e.g., the entire week). The weather information may also include other information, such as the temperature (e.g., the temperature forecast for a particular day, for a particular time of day, each day of the entire week), humidity, pressure, pollution level, dew point, allergen conditions, etc.

Some embodiments of the invention integrate with multiple public or private sources of weather data. For example, the weather information can be retrieved from the US Government system called the Wireless Emergency Alerts (WEA). The Wireless Emergency Alerts system is provided by the Federal Communications Commissions (FCC) and the Federal Emergency Management Agency. In these embodiments, the Wireless Emergency Alerts trigger alerts on the computing device 100 corresponding to emergency weather conditions. For example, a weather-based reminder may be triggered if the weather alert retrieved from the Wireless Emergency Alerts system satisfies a weather condition associated with a reminder. In conjunction with the alerts, or instead of them, the reminder application can receive weather information from other sources (e.g., a weather forecast service, device-local measurements, etc.).

The reminder application 140 uses one or more pieces of the above-mentioned information from the weather server 180, device-local measurements, and/or other public or private sources of weather data to trigger weather-based reminders. The reminder application also provides a variety of different user interface ("UI") items to create a new reminder and associate the reminder with a weather condition. For instance, the reminder application might provide a button to add a new reminder and a text field to input text (e.g., a reminder title and/or note). The reminder application might also provide a list of different weather conditions that the application's user 110 can use to choose one or more weather conditions to associate with the new reminder.

In some embodiments, the reminder application 140 allows the user 110 to create a new weather-based reminder using voice control. That is, the user can add a new reminder by talking into a microphone attached to the computing device 100. For example, the user can add the new reminder by simply saying, "Remind me when it rains" or "Remind me when it's going to rain for the next four days". To facilitate the voice control, the reminder application of some embodiments interfaces with a speech recognition program. In other words, the reminder application includes a set of modules that is integrated with the speech recognition program to create new reminders. The speech recognition program of some embodiments executes on the computing device 100 to act as an intelligent personal assistant for the user. Alternatively, or conjunctively with creating weather-based reminders using voice control, the reminder application 140 of some embodiments allows a user to create reminders using other means. Example of such other means include eye trackers, facial gesture recognition tools (e.g., via infrared light), speech assistance tools, and other assistive technology (e.g., universal access technologies for disabled individuals).

As shown in FIG. 1, the reminder application 140 displays a weather-based notification 150. Specifically, the reminder application displays the notification by reading one or more pieces of information from the location provider 160 and/or the weather server 180. The reminder application 140 may also use the computing device's 100 internal clock data to identify the date and time.

Figure 2:
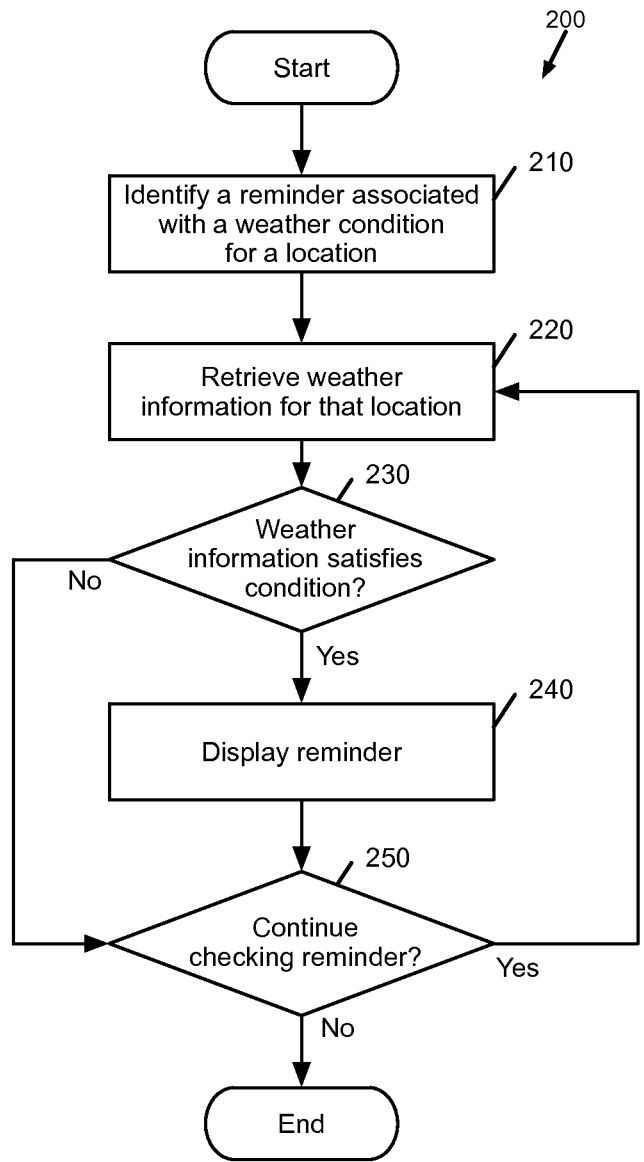
FIG. 2 provides conceptually illustrates a process that some embodiments use to display a notification based on a weather condition.

Having described the elements of FIG. 1, the operations of presenting a weather-based reminder will now be described in conjunction with FIG. 2. FIG. 2 provides conceptually illustrates a process 200 that some embodiments use to display a notification based on a weather condition. In some embodiments, the process 200 is performed by the reminder application 140. This process 200 begins after a new reminder has been created and associated with a weather condition.

As shown in FIG. 2, the process 200 identifies (at 210) a reminder associated with a weather condition for a location. The location may be the current location of the computing device 100 or a different location that is specified by the user 110. In some embodiments, the process 200 receives GPS coordinates (e.g., longitudinal, altitudinal, and latitudinal coordinates) from the location provider 160 and uses the coordinates to estimate the current location. Alternatively, the process 200 uses other methods (e.g., cell tower triangulation) to estimate the current location.

At 220, the process 200 retrieves weather information for the location. In retrieving the weather information, the process might send location data (e.g., the GPS coordinates) to the weather server 180. Based on the location data, the weather server 180 then sends weather information for that location. In some embodiments, the process 200 uses weather information that has been previously downloaded from the weather server 180. For example, the weather information may already be cached in a storage of the computing device 100. In such cases, the process 200 does not request the current weather information from the weather server 180 but uses the most recent weather information that has been downloaded from the weather server 180.

As shown in FIG. 2, the process 200 determines (at 230) if the retrieved weather information satisfies the weather condition associated with the reminder. When the weather information satisfies the weather condition, the process 200 then displays (at 240) the reminder. In some embodiments, the weather data does not have to exactly match the weather condition. For example, a reminder might state that temperature has to be at or above 85 degrees for more than 4 hours. So, any temperature at or above 85 degrees for more than four hours would satisfy the weather condition.

In some embodiments, the reminder is presented with its associated content (e.g., text strings, audio clips, graphical images, or video clips). In the example illustrated in FIG. 1, the notification is presented with a message (e.g., title, note) in a notification window (e.g., of a lock screen). The message states, "It's Going to Rain. Turn Off Sprinklers." The notification is also associated with (1) a time that identifies when it was triggered (e.g., 1 minute ago) and (2) an icon that indicates that the notification message is for a reminder. In some embodiments, the notification is presented as a banner that rotates into view (e.g., when the device is not locked). The notification may also be listed in a notification center that lists different notifications. In conjunction with or instead of the notification, the reminder application of some embodiments causes the computing device to play a sound, causes the device to vibrate, and/or instructs another application to perform an action. For example, the trigger of a reminder might cause a separate intelligent personal assistant program to speak the reminder. In some embodiments, the intelligent personal assistant program is integrated with the reminder application to set new weather-based reminders through voice commands.

When the retrieved weather information does not satisfy the identified reminder's weather condition the process 200 determines (at 250) whether to continue checking the identified reminder. If so, the process 200 returns to operation 220, which is described above. Otherwise, the process 200 ends. In some embodiments, weather information is retrieved or pulled periodically several times a day for weather-based reminders. The retrieval can occur at a set time interval and/or when the computing device 100 is awaken from sleep mode or turned on. The weather-based reminder may also be associated with a repeat parameter. In some embodiments, the repeat parameter instructs the process 200 to continue checking even after the weather condition has been satisfied. This allows a person to be reminded multiple times (e.g., each time there is rain or snow). In some embodiments, the process 200 allows the person to manually disable or delete the weather-based reminder.

In the example described above, the process 200 displays the reminder when the weather information satisfies the weather condition. However, the process 200 might consider one or more other factors when presenting the reminder. That is, in addition to the weather condition, the reminder might be associated with one or more other conditions, such as temperature, date and time, a location, a pressure level, humidity, pollution level, dew point, allergen conditions, etc. For instance, the reminder may be associated with a rainy weather condition, and a date and time value. In such a case, the process 200 might check one condition, iterate to a next condition, and check the next condition. When one or more of those conditions are satisfied, the process 200 then displays the reminder.

Many more examples of creating and presenting weather-based reminders are described below. Specifically, Section I describes several examples of creating weather-based reminders. Section II then describes examples of displaying notifications based on a composite reminder associated with multiple different conditions. Section II also describes an example process for such a composite reminder. Section III then describes additional examples of creating weather-based reminders. This is followed by Section IV that describes an example software architecture of the reminder application of some embodiments. Section IV also includes a description of example data structures that some embodiments use to create reminder objects. Finally, section V describes several electronic systems that implement some embodiments described herein.

I. Examples of Creating Weather-Based Reminders

In some embodiments, the reminder application provides a set of tools to create a new reminder and associate it with a weather condition. Several examples creating different weather-based reminders will now be described by reference to FIGS. 3-6.

A. Creating a Reminder Based Only on Weather

Figure 3:
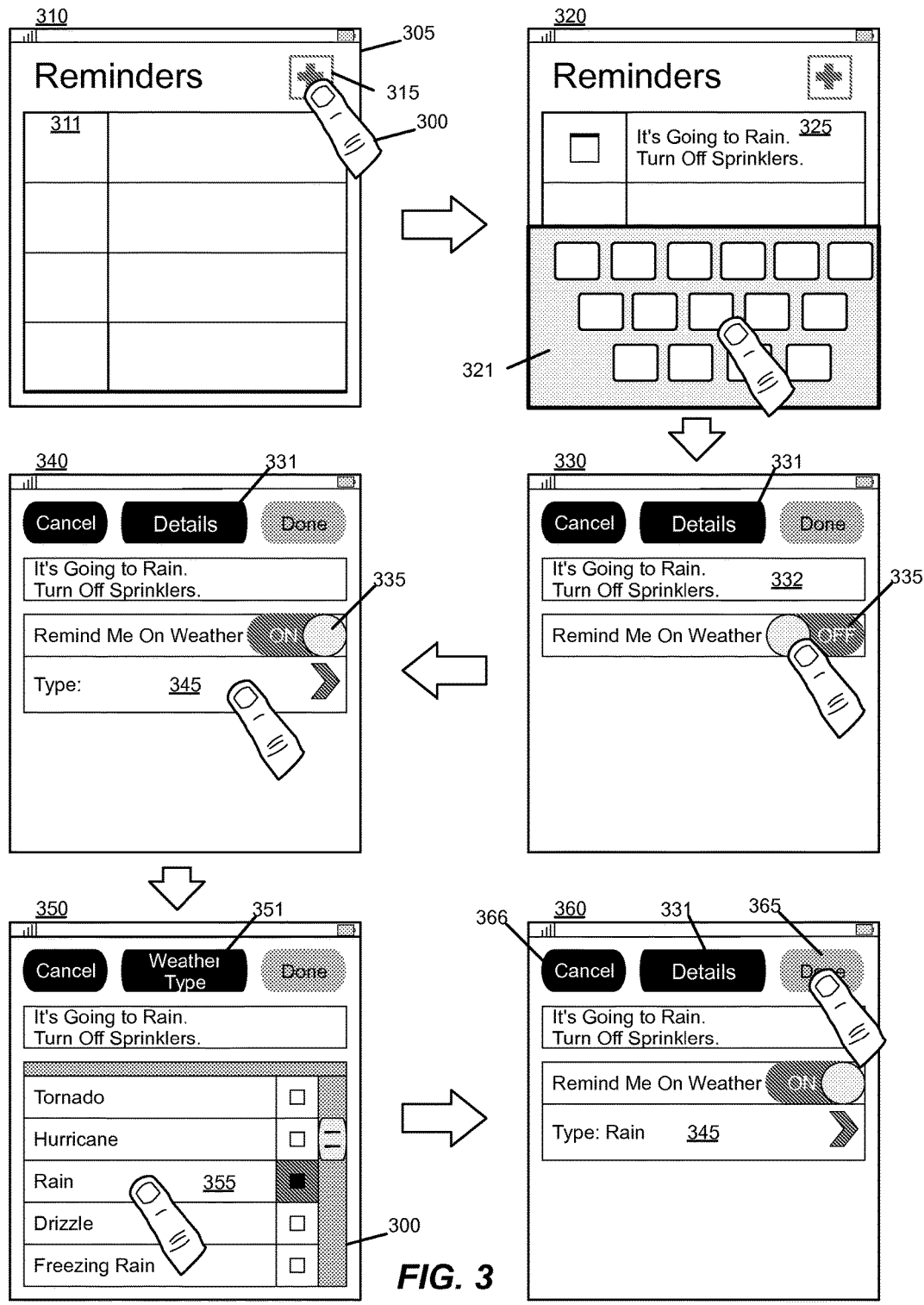
FIG. 3 conceptually illustrates creating a reminder that is based solely on one or more weather conditions.

The reminder application of some embodiments allows its user to create a reminder that is based solely on one or more weather conditions. FIG. 3 conceptually illustrates creating such a reminder. This reminder is the same as the one that is triggered in the example of FIG. 1. Six operational stages 310, 320, 330, 340, 350, and 360 of the reminder application are illustrated in this figure.

As shown in FIG. 3, the reminder application 140 provides a graphical user interface ("GUI") 305 for receiving user input to define a weather-based reminder. Here, the GUI 305 is a touch-based interface that receives input through a touch operation or gesture, such as tapping the user's finger 300 on different GUI elements. However, the reminder application in some embodiments receives user input through other means, such as keyboard input or mouse input.

The first stage 310 illustrates the GUI 305 prior to adding any reminders. As such, the reminder application displays a reminders list 311 that is empty. The user might have first selected a reminder application icon from the operating system's desktop to open the reminder application and to display the reminder list 311. The reminders list 311 has several empty lines (e.g., boxes) to add different reminders. The GUI 305 includes an add button 315 for adding new reminders.

In the first stage 310, the user directs the reminder application to create a new reminder by selecting the add button 315. As shown in the second stage 320, the selection causes a virtual or on-screen keyboard 321 to appear. This allows the user to input a title for the reminder in the first available empty slot in the reminders list 311. The second stage 320 shows that the user has entered the title "It's Raining Turn off sprinklers." for the reminder 325. In some embodiments, the reminder application displays the title in a notification window when the reminder is triggered. The reminder application 140 of some embodiments creates a new reminder object that can be associated with one or more conditions. In some embodiments, the reminder object can be associated with content, such as audio clips, graphical images, or video clips.

The third stage 330 illustrates the GUI 305 after the user has inputted a title for the reminder. The reminder application is displaying a details menu 331 for editing the reminder. The user might have first selected the reminder 325 from the reminder list 311 to display the details menu 331 shown in the third stage 330. The details menu 331 includes a heading that identifies it as a "Details" menu. The menu also includes a display section 332 that displays the title of the reminder that is being edited.

As shown, the details menu 331 includes a weather toggle switch 335. The weather toggle switch 335 can be used to control whether a reminder is associated with a weather condition. That is, the user can select weather toggle switch 335 to switch an "ON" position to associate the reminder with a weather condition. In the third stage 330, the weather toggle switch 335 is in the "OFF" position. The user selects weather toggle switch 335 to toggle it to the "ON" position.

The fourth stage 340 shows the reminder application 140 after the weather toggle switch 335 has been toggled from the "OFF" to the "ON" position. As shown, the reminder application 140 provides additional GUI elements to control the weather-based reminder. Specifically, the reminder application 140 provides a weather type field 345. In fourth stage 340, the user selects the weather type field 345.

As illustrated in the fifth stage 350, the selection of the weather type field 345 causes the reminder application 140 to provide a weather type panel 351 that includes a list of different weather types. The user can use this list to choose a weather type to associate with the reminder. In some embodiments, the weather types correspond to standard weather forecast codes (e.g., National Oceanic and Atmospheric Administration weather forecast codes). Alternatively, the application might provide a redacted list of weather types based on the weather forecast codes. For example, the application might provide one weather type for two similar weather forecast conditions such as cloudy and partly cloudy.

In the fifth stage 350, the user scrolls through different weather types and selects "Rain" 355 as the weather type to associate with the reminder. The selection causes the reminder application to return to the details menu 331, as illustrated in the sixth stage 360. In the details menu 331, the weather type field 345 states that "Rain" has been selected as the weather condition for the reminder 325. To finish defining the new reminder, the user then selects a done button 365. Alternatively, the user can select the cancel button 366 to return to the reminder list 311 without associating a weather condition with the reminder 325.

In the example described above, the user selects one weather type to associate with the new reminder. In some embodiments, the reminder application allows the user to select multiple different weather types to associate with the new reminder. For instance, the reminder application might allow the user select not only the "Rain" weather type but also select "Drizzle", "Freezing Rain", etc. In addition, the reminder application 140 provides a set user interface items (e.g., text fields, buttons, switches, list, etc.) to create weather-based reminders. One of ordinary skill in the art would understand that the reminder application is just an example application, and that it can be implemented differently with a similar or different set of user interface items.

B. Creating a Reminder Based on Weather and Date

In the previous example, the reminder application creates a new reminder that is associated with only one weather condition. The reminder application of some embodiments allows its user to add a new reminder that is associated with both a weather condition and another different condition. Examples of such other conditions include the temperature (e.g., the temperature forecast for a particular day, for a particular time of day, each day of the entire week), humidity, pressure, pollution level, dew point, allergen conditions, etc. In some embodiments, the reminder application allows the user to specify whether to the reminder is presented when only one condition is satisfied, or when more than one conditions are satisfied.

Figure 4:
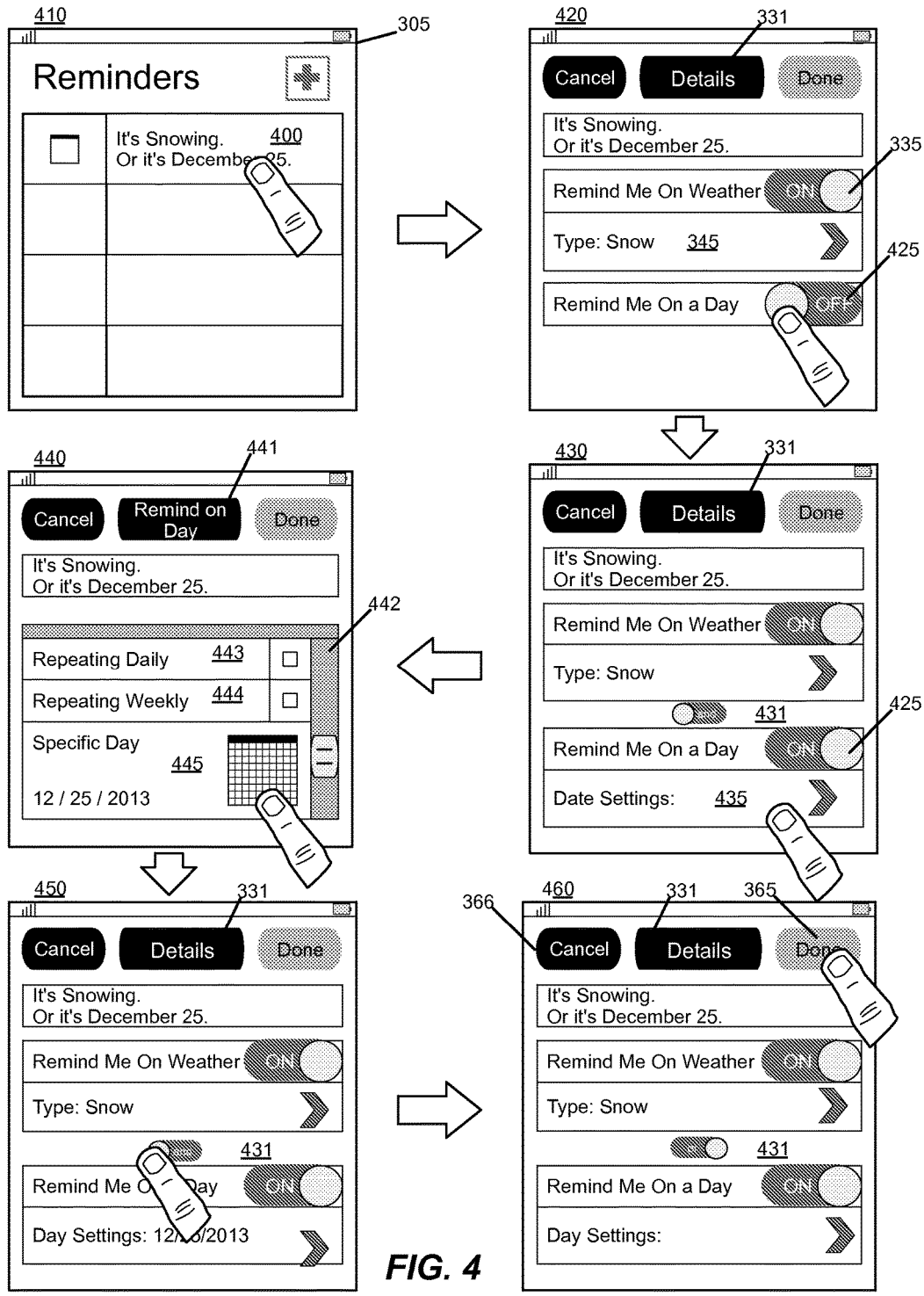
FIG. 4 provides an illustrative example of defining a composite reminder that is associated with both a weather condition and a time condition.

FIG. 4 provides an illustrative example of defining a composite reminder 400 so that it is associated with both a weather condition and a date condition. Specifically, this figure illustrates in six operational stages 410, 420, 430, 440, 450, and 460 how the reminder 400 that is associated with a weather condition can be modified to include a date condition. This figure also illustrates defining the reminder 400 such that it is triggered when only one of the two conditions is satisfied. That is, the reminder 400 will be a composite reminder that includes independent weather-based and time-based reminder conditions.

As described above in connection with FIG. 3, the reminder application 140 provides a GUI 305 for receiving user input to define a weather-based reminder. In the example illustrated in FIG. 4, the GUI 305 is expanded to include time-based controls. The six operational stages 410, 420, 430, 440, 450, and 460 will show several operations performed with the GUI 305.

The first stage 410 shows the reminders list 311 of GUI 305. The reminders list 311 lists the reminder 400. Reminder 400 is titled "It's Snowing. Or it's December 25." In the first stage 410, the user selects the reminder 400 from the reminders list 311. The selection causes the reminder application 140 to transition to the details menu 331. This menu 331 allows the user to edit details associated with reminder 400.

The second stage 420 shows the details menu 331 that is associated with the reminder 400. As shown, the details menu 331 includes the type field 345 to input a weather type. This type field 345 shows that the reminder 400 has been previously associated with a weather type, namely "Snow". Accordingly, the reminder 400 will be displayed by the reminder application 140 when the reminder application 140 receives weather information that includes a forecast of snow.

In addition to the type field 345, the details menu 331 includes a date toggle switch 425. The date toggle switch 425 can be used to control whether a reminder is associated with a particular date. That is, the user can select date toggle switch 425 to switch an "ON" position to associate the reminder with a date. In the second stage 420, the date toggle switch 425 is in the "OFF" position. The user selects date toggle switch 425 to toggle it to the "ON" position.

The third stage 430 shows the details menu 331 after the date toggle switch 425 has been toggled to the "ON" position. As shown, the reminder application 140 then provides a date field 435 and a condition toggle switch 431. The date field 435 allows the user to input a date for the reminder. The condition toggle switch 431 allows the user to select either an "and" condition or an "or" condition setting for the reminder. When the condition toggle switch 431 is in the "and" position, the reminder application 140 will require both a weather condition (e.g. snow or rain), and a date and time condition (e.g. December $25^{th}$ at 3:00 pm) to be satisfied before triggering the reminder. When the condition toggle switch 431 is in the "or" position, the reminder application 140 will require only at least one of the weather condition, and the date and time condition to be satisfied before triggering the reminder.

In third stage 430, the user selects the date field 435. The selection of the date field 435 causes the reminder application 140 to provide addition GUI elements. As shown, the GUI 305 now displays a remind on day panel 441. This panel includes list of time and date settings 442 that includes a calendar tool 445 that the user can use to choose a date and time to associate with the reminder. The list of time and date settings 442 also includes several options 443 and 444 to repeat the reminder. Specifically, the list includes (1) a repeat daily option 443 to specify whether the reminder is triggered on a daily basis and (2) a repeat weekly option 443 to specify whether the reminder is triggered on a weekly basis.

As shown in the fourth stage 440, the user selects the calendar tool 445 to choose a date for the reminder 400. In this example, the user selects Dec. 25, 2013 with the calendar tool 445. This is shown in the fifth stage 450 because the date field 435 now shows that date. Here, the condition toggle switch 431 is in the "and" position. This requires both the weather condition, and date and time condition to be satisfied before the reminder is triggered. To toggle the condition toggle switch 431 to the "or" position, the user selects it from the details menu 331. As mentioned above, when the condition toggle switch 431 is in the "or" position, the reminder application 140 will require only at least one of the weather condition (i.e. snow as indicated by the type field 345), and the date and time condition (i.e. Dec. 25, 2013 as indicated by the date field 435) to be satisfied before triggering the reminder.

The sixth stage 460 shows the details menu 331 after the condition toggle switch 431 has been toggled to the "or" position. To finish defining the new reminder, the user then selects the done button 365. In some embodiments, the selection of the done button 365 causes the reminder application 140 to return to the reminders list 311 and store the reminder 400. This reminder will then be displayed when either one or both of its weather condition and date condition are met. Alternatively, the user can select the cancel button 366 to return to the reminder list 311 without associating the time condition with the reminder 400.

II. Example Notifications

Figure 5:
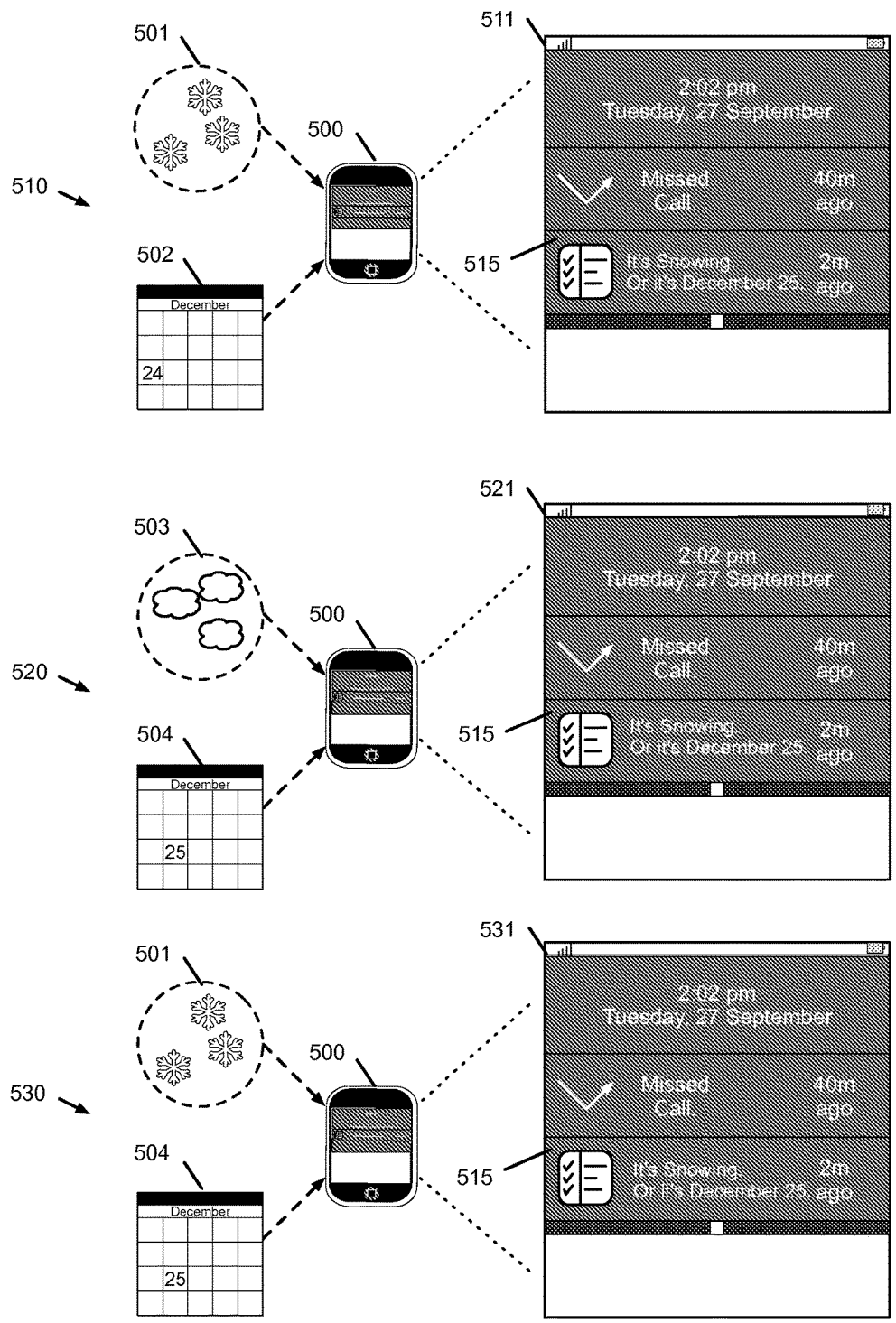
FIG. 5 conceptually illustrates several cases of when a composite reminder will be presented as a notification on a mobile device.

The previous section described creating several weather-based reminders. Several examples of triggering weather-based reminders will now be described by reference to FIG. 5. In the example of FIG. 4, the reminder 400 is associated with both a weather condition, and a date and time condition. Only one of these two conditions needs to be satisfied before the reminder 400 is triggered. FIG. 5 conceptually illustrates three different cases 510, 520, and 530 when the reminder 400 will be presented as a notification on a mobile device 500 that is executing the reminder application 140.

The case 510 illustrates displaying a notification when only the weather data for a location satisfies the weather condition. As shown in case 510, the device 500 is receiving weather information 501 and date information 502. Weather information 501 conceptually illustrates a snow forecast with three snowflakes in a dashed circle. Since the weather information 501 indicates a snow forecast, it satisfies the snow condition that is associated with the reminder 400. Date information 502 conceptually illustrates a date of December 24. Here, the date and time condition has not been satisfied. However, the reminder application displays the notification 515 because at least the weather condition of reminder 400 has been satisfied.

The case 520 illustrates displaying notification 515 when only the date and time data satisfies the date and time condition. As shown in case 520, the device 500 is receiving weather information 503 and date information 504. Since the weather information 503 identifies a cloudy forecast, it does not satisfy the snow condition that is associated with the reminder 400. However, the date and time data 504 satisfies the date and time condition that is associated with the reminder. As such, the reminder application 140 displays the notification 515.

The case 530 illustrates displaying notification 515 when all conditions have been satisfied. As shown in case 530, the device 500 is receiving weather information 501 and date information 504. Either one of these will satisfy the conditions of reminder 400. In some embodiments, the reminder application 140 checks a first condition. If the first condition has been satisfied and the reminder does not require another condition to be satisfied, the reminder application does not check the other condition. As shown in cases 510, 520, and 530, the reminder application 140 displays a same notification 515 for reminder 400 no matter which condition is satisfied. In some embodiments, the reminder application 140 provides an interface for allowing a user to specify different notifications to display based on which particular conditions are satisfied.

Figure 6:
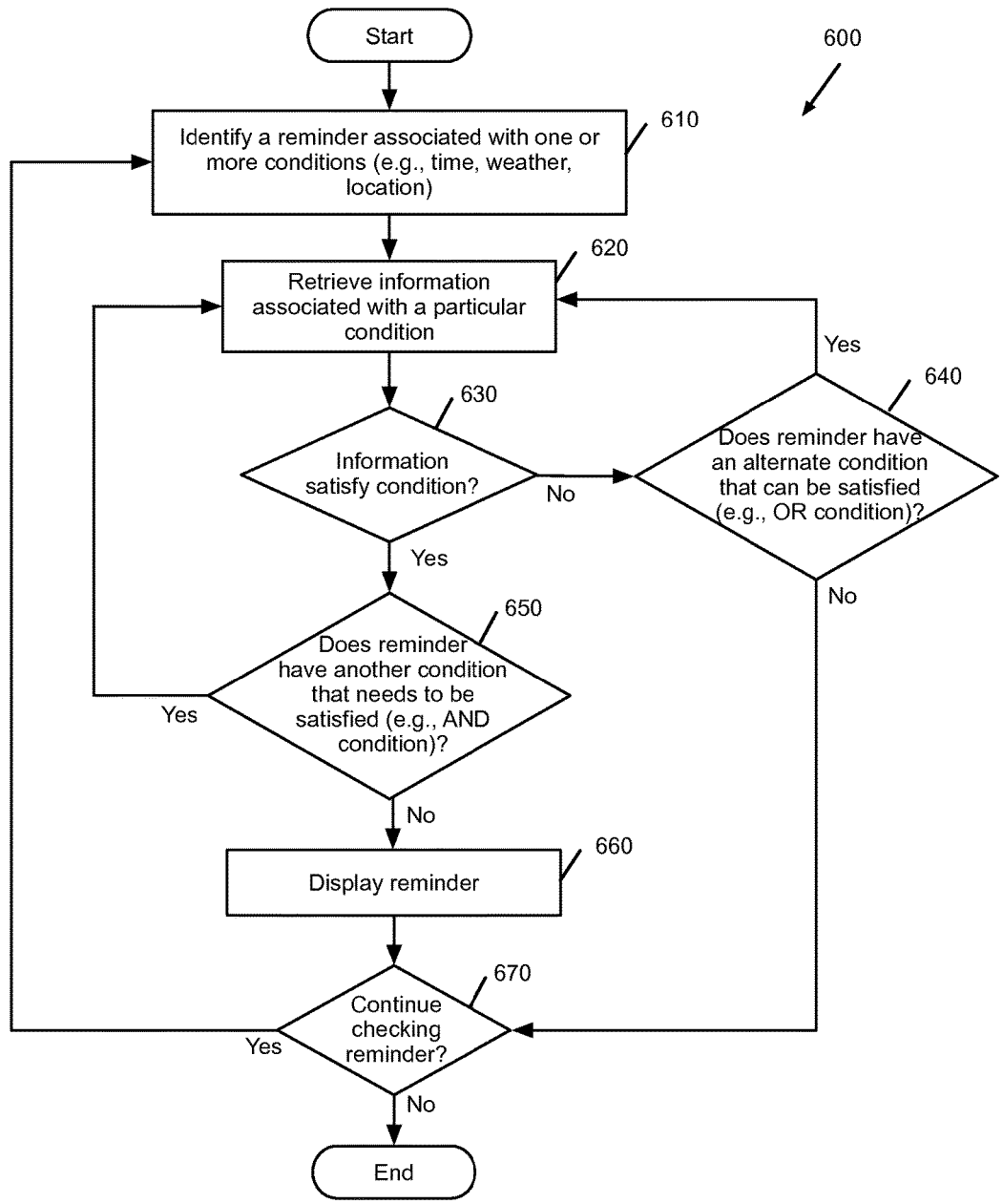
FIG. 6 conceptually illustrates a process that some embodiments perform to display a reminder that is associated with multiple conditions.

Having described examples of displaying reminders with multiple conditions, an example process will now be described by reference to FIG. 6. FIG. 6 conceptually illustrates a process 600 that some embodiments perform to display a reminder that is associated with multiple conditions. In some embodiments, the process 600 is performed by the reminder application 140. This process 600 begins after a new reminder has been created and associated with one or more conditions.

As shown in FIG. 6, the process 600 begins when it identifies (at 610) a reminder associated with one or more conditions (e.g., time, weather, location). The process 600 then retrieves (at 620) information associated with a particular condition. If the condition is a weather condition, the process 600 might retrieve the information from a weather service. Alternatively, the process 600 might use data that is available locally (e.g., the current date and time, weather information that has been downloaded previously).

At 630, the process 600 determines whether the retrieved information satisfies the particular condition. If so, the process proceeds to 640, which is described below. When the retrieved information does not satisfy the particular condition, the process 600 determines (at 640) if there is an alternate condition (e.g., an OR condition) that can be satisfied. Where there is an alternate condition, the process 600 returns to operation 620, which is described above. Otherwise, the process proceeds to 670, which is described below.

The process determines (at 640) whether the reminder requires another condition (e.g., an AND condition) to be satisfied. Where there is another condition, the process 600 returns to 620, which is described above. Otherwise, the process displays (at 660) the reminder. The process then determines (at 660) whether to continue checking the identified reminder. If so, then the process 600 returns to operation 610, which is described above. Otherwise, the process 600 ends.

Some embodiments perform variations on the process 600. The specific operations may not be performed in one continuous series of operations, and different specific operations may be performed in different embodiments. In addition, while the process 600 described above by reference to FIG. 6 displays a reminder that is associated with multiple conditions by iteratively checking conditions, one of ordinary skill in the art will understand that the process of some embodiments may be performed for several reminders simultaneously. For instance, the process 600 of some embodiments retrieves data for several reminders at a time. In some embodiments, the process 600 retrieves all potentially condition-satisfying information for a particular reminder at a single time. Furthermore, the process 600 could be implemented using several sub-processes, or as part of a larger macro process.

III. Additional Examples of Weather-Based Reminders

The previous examples of weather-based reminders relied on one or more weather conditions. In some embodiments, the reminder application provides a set of tools to modify weather conditions to account for weather forecast durations and weather forecast locations. Several examples of creating different weather-based reminders with modified weather conditions will now be described by reference to FIGS. 7-10.

A. Weather-Based Reminder Associated with a Duration

Figure 7:
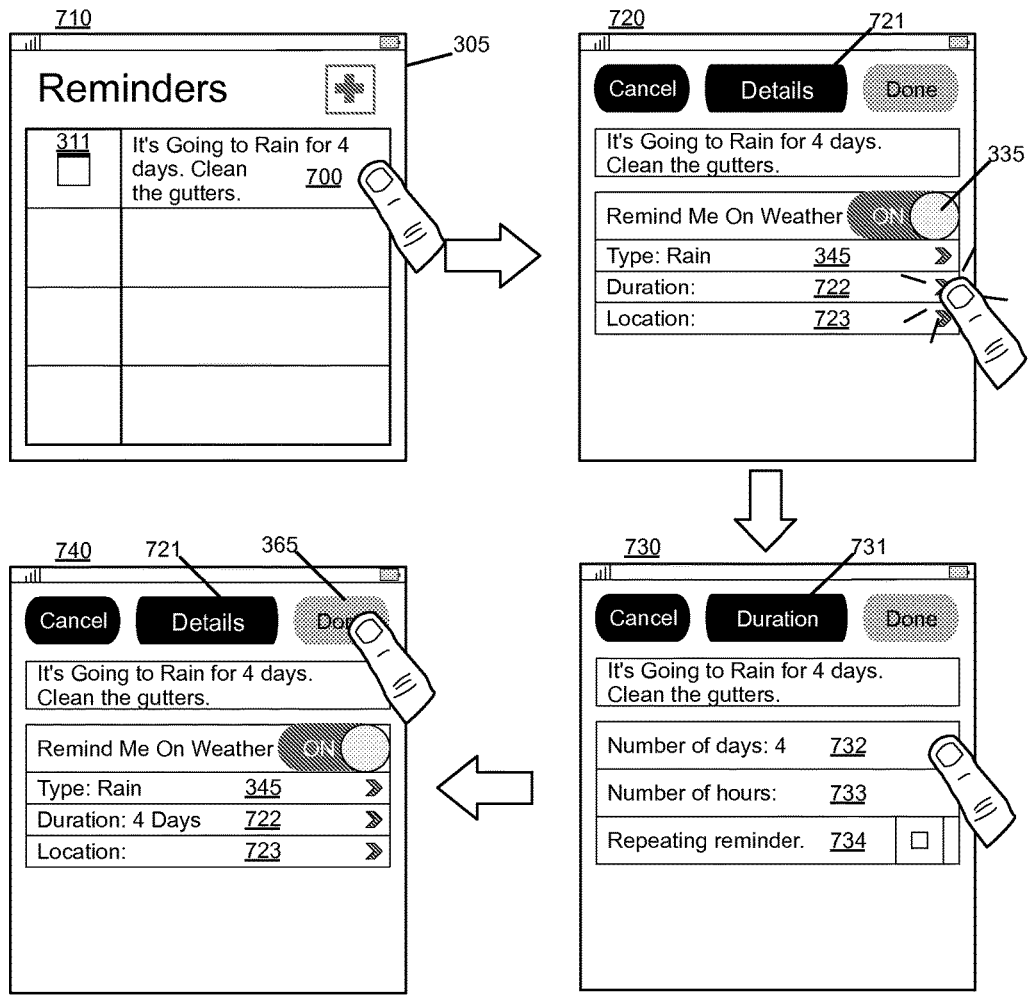
FIG. 7 conceptually illustrates use of the reminder application to create a reminder that requires a weather forecast to last for a specified duration.

The reminder application of some embodiments allows its user to create a weather-based reminder that has a required duration for a particular weather condition. FIG. 7 conceptually illustrates use of the reminder application 140 to create a reminder 700 that requires a weather forecast to last for a duration. Four operational stages 710, 720, 730, and 740 of the reminder application are illustrated in this figure.

The first stage 710 shows the reminders list 311 of GUI 305 after adding reminder 700. Reminder 700 is titled "It's Going to Rain for 4 Days. Clean the Gutters." In the first stage 710 the user is selecting reminder 700. The second stage 720 illustrates the details menu 721 after reminder 700 has been selected. As shown, the details menu 721 includes the weather toggle switch 335, the weather type field 345, a weather duration field 722, and a weather location field 723. As indicated by the weather toggle switch 335 and the weather type field 345, reminder 700 is a weather-based reminder with a rainy weather condition. When selected, the weather duration field 722 allows a user to set a duration for a weather condition. In the second stage 720, the user is selecting the weather duration field 722.

The third stage 730 shows the weather duration control menu 731 for setting durations and time controls for weather conditions. The weather duration control menu 731 includes a number of days setting 732, a number of hours setting 733, and a repeating reminder setting 734. The number of days setting 732 allows a user to select a number of days a weather forecast duration or weather event duration must be before triggering a weather condition. The number of hours setting 733 allows a user to select a number of hours a weather forecast duration must last. The repeating reminder 734 setting allows a user to set a reminder to repeat for multiple instances of weather forecasts.

As shown in the third stage 730, the user has set the number of days setting 732 to a duration of 4 days. Due to this setting, the reminder application 140 will only display reminder 700 when the reminder application retrieves a weather forecast of 4 days of rain. In some embodiments, the reminder application 140 uses a default forecast length (e.g. 1 day) for weather-based reminders that have not been set to a specific duration with the weather duration control menu 731.

The selection of the duration for reminder 700 causes the reminder application to return to the details menu 721, as illustrated in the fourth stage 740. In the details menu 721 the weather duration field 722 shows that "4 Days" has been selected. To finish defining the reminder 700, the user then selects the done button 365.

B. Weather-Based Reminder Associated with a Location

Figure 8:
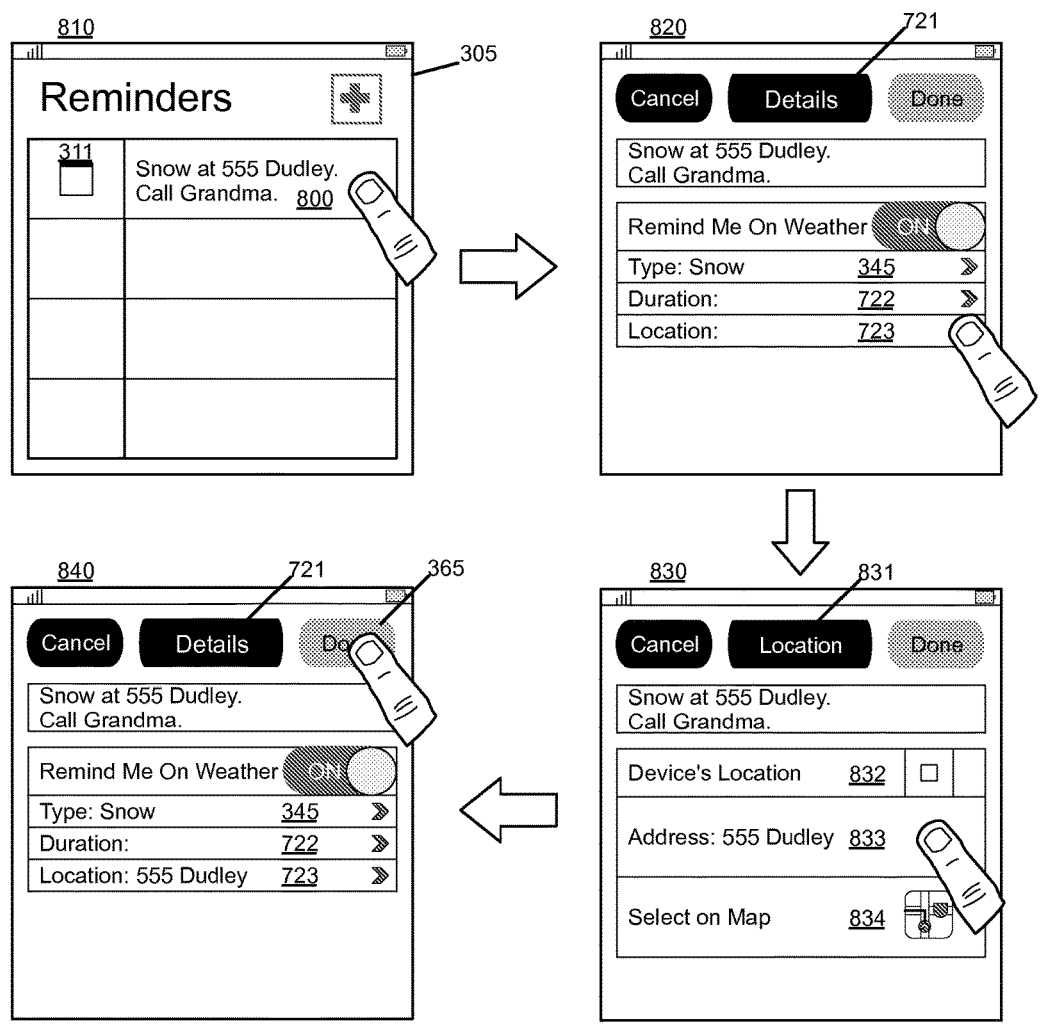
FIG. 8 conceptually illustrates use of the reminder application to create a reminder that requires a weather forecast to occur at a specified location.

The reminder application of some embodiments allows its user to create a weather-based reminder that has a required location for a particular weather condition. FIG. 8 conceptually illustrates use of the reminder application 140 to create a reminder 800 that requires a weather forecast to occur at a specified location. Four operational stages 810, 820, 830, and 840 of the reminder application are illustrated in this figure.

The first stage 810 shows the reminders list 311 of GUI 305 after adding reminder 800. Reminder 800 is titled "Snow at 555 Dudley. Call Grandma." In the first stage 810, the user is selecting reminder 800.

The second stage 820 illustrates the details menu 721 after reminder 800 has been selected. As shown, the details menu 721 includes the weather toggle switch 335, the weather type field 345, the weather duration field 722, and the weather location field 723. As indicated by the weather toggle switch 335 and the weather type field 345, reminder 800 is a weather-based reminder with a snow weather condition. When selected, the weather location field 723 allows a user to set a location for a weather condition. In the second stage 820, the user is selecting the weather location field 723.

The third stage 830 shows a weather location control menu 831 for setting locations for weather conditions. The weather location control menu 831 includes a device's location setting 832, an address setting 833, and a select on map button 834. The device's location setting 832 allows a user to instruct the reminder application 140 to use the location of the device executing the reminder application 140 as the location of a weather forecast. In some embodiments, the reminder application 140 uses the location of the device executing the reminder application as a default location setting. The select on map button 834 provides a graphical map for a user to select in order to specify an address for address setting 833. The address setting 833 allows a user to enter a specific address to be used in retrieving weather forecasts. In the example shown in the third stage 830, the user has selected 555 Dudley. This will cause the reminder application 140 to retrieve weather information at or near 555 Dudley when determining whether to display reminder 800.

The selection of the location for reminder 800 causes the reminder application to return to the details menu 721, as illustrated in the fourth stage 840. The weather location field 723 of the details menu 721 shows that "555 Dudley" has been selected. To finish defining the reminder 800, the user then selects the done button 365.

C. Weather-Based Reminder Associated with Location and Duration

Figure 9:
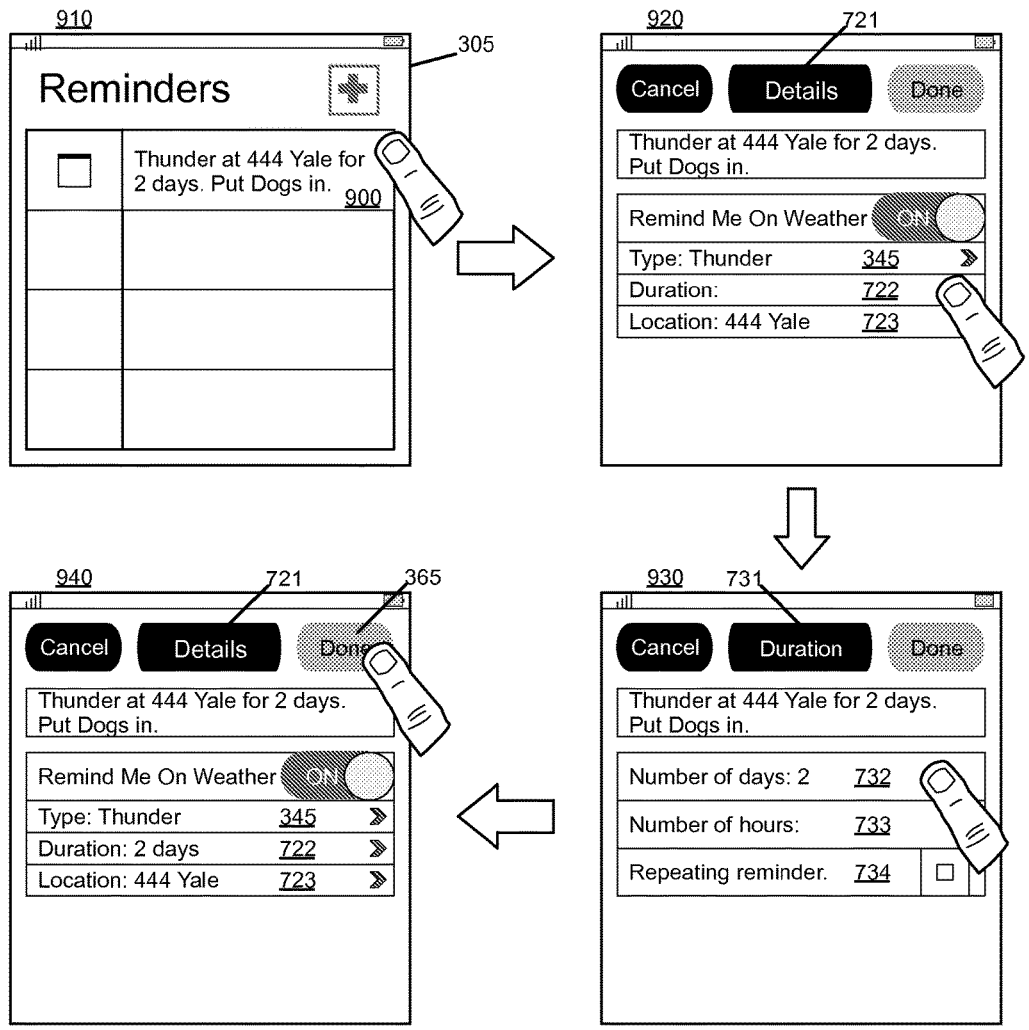
FIG. 9 conceptually illustrates use of the reminder application to create a reminder such that its weather condition depends on a specified duration as well as a specified location.

In the examples above, either a duration or a location was set for a weather condition. The reminder application of some embodiments allows its user to create a weather-based reminder that has both a required location and a required duration for a particular weather condition. FIG. 9 conceptually illustrates use of the reminder application 140 to create reminder 900 such that its weather condition depends on duration as well as location in four operational stages 910, 920, 930, and 940.

The first stage 910 shows the reminders list 311 of GUI 305 after adding reminder 900. Reminder 900 is titled "Thunder at 444 Yale for 2 days. Put dogs in." As shown in the first stage 910, the user is selecting reminder 900 in order to transition to the details menu 721.

The second stage 920 shows the details menu 721 after reminder 900 has been selected. As shown, the details menu 721 includes the weather toggle switch 335, the weather type field 345, the weather duration field 722, and the weather location field 723. As indicated by the details menu 721, reminder 900 has already been configured to require a forecast of thunder at 444 Yale to be triggered. In the second stage 920, the user is selecting the weather duration field 722.

The third stage 930 shows the weather duration control menu 731. The weather duration control menu 731 includes the number of days setting 732, the number of hours setting 733, and the repeating reminder setting 734. As shown in the third stage 930, the user has set the number of days setting 732 to a duration of 2 days. The selection of the duration for reminder 900 causes the reminder application to return to the details menu 721, as illustrated in the fourth stage 940. As shown in the fourth stage 940, reminder 900 requires a forecast of thunder for 2 days at 444 Yale.

D. Weather-Based Reminder Associated with Temperature

Figure 10:
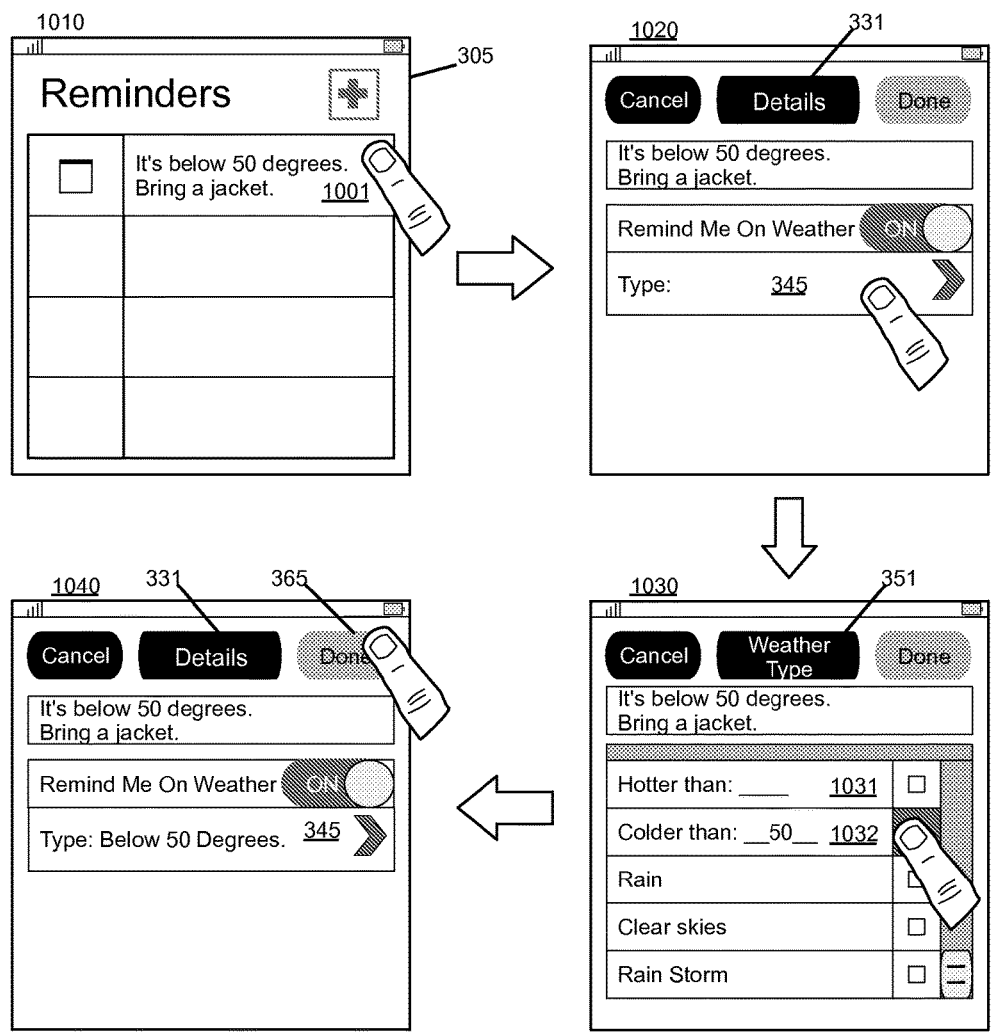
FIG. 10 conceptually illustrates use of the reminder application to create a reminder with a temperature condition.

The reminder application of some embodiments allows its user to create a temperature condition for a weather-based reminder. FIG. 10 conceptually illustrates use of the reminder application 140 to create reminder 1000 in four operational stages 1010, 1020, 1030, and 1040.

The first stage 1010 shows the reminders list 311 of GUI 305 after adding reminder 1000. Reminder 1000 is titled "It's below 50 degrees. Bring a jacket." As shown in the first stage 1010, the user is selecting reminder 1000 in order to transition to the details menu 331.

The second stage 1020 shows the details menu 331 after reminder 1000 has been selected. As shown, the details menu 331 includes the weather toggle switch 335 and the weather type field 345. As indicated by the weather toggle switch 335, reminder 1000 has already been configured to have a weather condition. In the second stage 1020, the user is selecting the weather type field 345.

The third stage 1030 shows the weather type panel 351 and its list of different weather types. The list of different weather types include a hotter than setting 1031 and a colder than setting 1032. The hotter than setting 1031 and the colder than setting 1032 allow a user to set a temperature limited weather condition. As shown in the third stage 1030, the user has set the colder than setting 1032 to 50 degrees. In some embodiments, the reminder application uses Celsius temperatures instead of Fahrenheit temperatures. The selection of the temperature for reminder 1000 causes the reminder application to return to the details menu 331, as illustrated in the fourth stage 1040. The details menu 331 shows that reminder 1000 requires a forecast of less than 50 degrees.

IV. Software Architecture

A. Example Software Architecture

Figure 11:
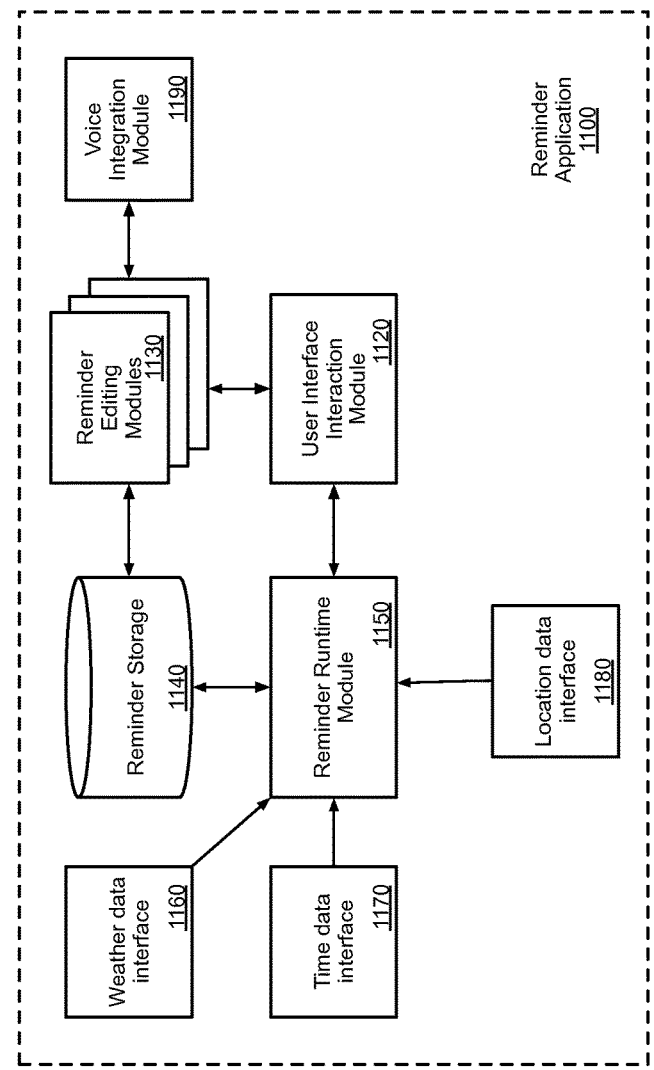
FIG. 11 conceptually illustrates the software architecture of a reminder application of some embodiments.

In some embodiments, the processes described above are implemented as software running on a particular machine, such as a computer or a handheld device, or stored in a machine-readable medium. FIG. 11 conceptually illustrates the software architecture of a reminder application 1100 of some embodiments. In some embodiments, the reminder application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The reminder application 1100 includes a user interface interaction module 1120, reminder editing modules 1130, a reminder runtime module 1150, a weather data interface 1160, a time data interface 1170, a location data interface 1180, and a voice integration module 1190. The figure also illustrates a reminder storage 1140 that stores reminders defined with the reminder application 1100. The reminder application might also interface with various operating service modules, such as a display module. For example, the display module may receive signals (e.g., from the user interface interaction module 1120) describing what should be displayed and translates these signals into pixel information that is sent to the display device. The display device may be an LCD, plasma screen, CRT monitor, touchscreen, projection device (e.g., for presenting reminders on a wall) etc. As mentioned above, the reminder may not be displayed but presented differently. For example, a triggering of a weather-based reminder might cause the reminder to be spoken aloud through a speaker connected to the computing device or might cause a particular sound to be played (e.g., a specialized beep, some other sound, etc.).

The user interface interaction module 1120 of the reminder application 1100 interprets the user input data and passes it to various modules, including the reminder editing modules 1130 and the reminder runtime module 1150. The user interface interaction module 1120 also manages the display of the user interface, and outputs this display information to the display device. In other words, the user interface interaction module 1120 generates a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a finger in the graphical user interface to control (e.g., select, move) objects in the graphical user interface. However, in some embodiments, objects in the graphical user interface can also be controlled or manipulated through other controls, such as cursor control. In some embodiments, touch control through finger input is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The reminder editing modules 1130 include a variety of modules for creating reminders (e.g., input a title, selecting reminder content, associating with one or more conditions), editing existing reminders, and deleting reminders. The reminder editing modules 1130 receive instructions translated from user input received by the user interface interaction module 1120. In some embodiments, the reminder editing modules 1130 create and modify reminders stored in the reminder storage 1140 according to the instructions received from the user interface interaction module 1120.

The reminder runtime module 1150 determines when reminders should be displayed. The reminder runtime module 1150 of some embodiments checks conditions associated reminders stored in reminder storage 1140 based on information received from weather data interface 1160, time data interface 1170, and location data interface 1180. The reminder runtime module 1150 of some embodiments checks reminder conditions associated with enabled reminders at a set interval (e.g., periodically throughout the day). The reminder runtime module 1150 also provides feedback to the user interface interaction module 1120 based on data received from interfaces 1160, 1170, and 1180.

Weather data interface 1160 is an interface via which the reminder application retrieves weather data. The weather data may be retrieved from a weather service or may be retrieved locally from device's storage if the weather data has been previously downloaded from the weather service. Different from the weather data interface 1160, the time data interface 1170 is an interface via which the current date and time is retrieved. The time data interface 1170 of some embodiments retrieves time and date information from a time server (not shown). The location data interface 1180 of some embodiments retrieves location data from the location provider 160. The current location may also be estimated using other means (e.g., cell tower triangulation).

The voice integration module 1190 allows the reminder application to create or delete reminders using voice control. That is, the application's user can add a new reminder by talking into a microphone attached to a computing device. For example, the user can add the new reminder by simply saying, "Remind me when it rains" or "Remind me when it's going to rain for the next four days". To facilitate the voice control, the voice integration module 1190 of some embodiments interfaces with a speech recognition program. The speech recognition program of some embodiments executes on the computing device to act as an intelligent personal assistant for the user. In some embodiments, the speech recognition program identifies certain keywords such as the word "remind" or "reminder". Then, the speech recognition program tries to identify a weather condition such as "when it rains" or "when it's going to rain for the next four days". The speech recognition program then instructs the reminder application to create the new reminder that is based on voice instructions.

In some embodiments, the reminder application includes a voice integration module that receives media files (e.g., audio files, video files, etc.) from storage devices (e.g., external drives, recording devices, etc.) through one or more ports (e.g., a USB port, Firewire port, etc.) of the device on which the application 1100 operates and translates this media data for the reminder application or stores the data directly onto a storage of the device. The received media files can be used by the reminder application 1100 as content for reminders.

While many of the features of reminder application 1100 have been described as being performed by one module (e.g., the user interface interaction module 1120), one of ordinary skill in the art will recognize that the functions described herein might be split up into multiple modules. Similarly, functions described as being performed by multiple different modules might be performed by a single module in some embodiments.

B. Example Data Structures

Figure 12:
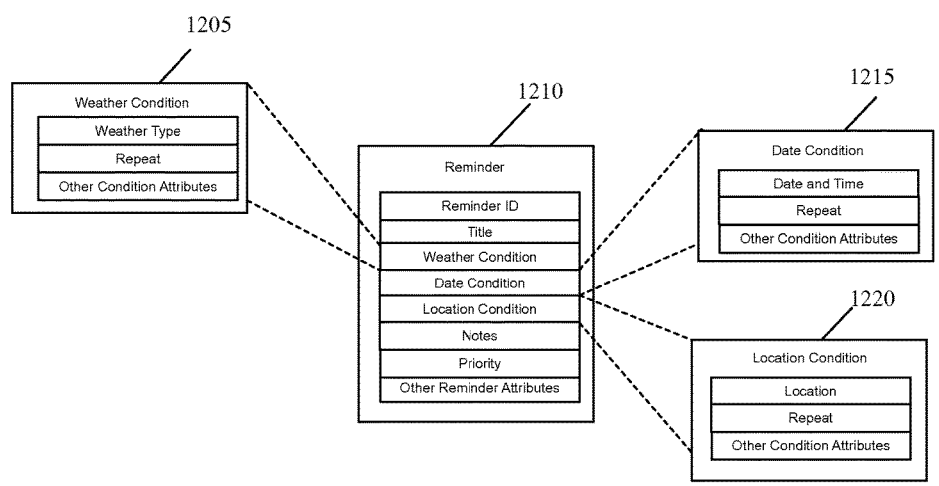
FIG. 12 conceptually illustrates several example data structures associated with the reminder application of some embodiments.

FIG. 12 conceptually illustrates several example data structures associated with the reminder application of some embodiments. As shown, the figure includes a reminder data structure 1210 that can be associated with several different conditions. In the example illustrated in this figure, the conditions are represented by a weather condition data structure 1205, a date condition data structure 1215, and a location condition data structure 1220.

For each reminder, the reminder application of some embodiments creates and stores a reminder object based on the format of the reminder data structure 1210. The reminder data structure 1210 includes a reminder ID, a title, a weather condition, a date condition, a location condition, a notes field, and a priority field. The reminder data structure can also include other attributes, such as links to different content items. The reminder ID is a unique identifier for the reminder that the application uses when referencing the reminder.

The title represents the title of the reminder. The title in some embodiments is the first item that the user inputs when creating a new reminder. The title may be shown each time the reminder has been triggered. The title may also be a required field. Different from the title field, the notes field allows the user to input additional details regarding the reminder. The notes field may be an optional field. The priority field can be used to give the reminder a priority value. Examples of such a priority value include no priority, low priority, medium priority, and high priority. The reminder application of some embodiments uses the priority value to present reminder (e.g., in a particular order).

As shown in FIG. 12, the reminder can be associated with several different conditions, including a weather condition, a date condition, and a location condition. Each of these conditions is shown as separate data structures. However, one or more of these conditions may be a part of the reminder data structure 1210.

The weather condition data structure 1205 includes a weather type field and a repeat field. The weather type field stores a particular type of weather (e.g., rainy, cloudy, sunny). This weather type determines when the reminder is triggered. In the example of FIG. 12, the weather condition is also associated with a repeat field that defines whether the reminder is repeated each time the weather data satisfies the weather condition. The weather condition data structure can include other attributes, such as a temperature, humidity, pressure, and pollution level.

The date condition data structure 1215 includes a date and time field and a repeat field. The date and time field stores a particular date and time. This is the particular date and time when the reminder is triggered. The date and time condition is also associated with a repeat field that defines whether the reminder is repeated. The date condition data structure can include other attributes, such as a repeat end parameter that specifies a date and time when the repeat operation ends.

The location condition data structure 1220 includes a location field and a repeat field. The location field stores a particular location. The location may be an address or part of an address such as a zip code. Alternatively, the location may be GPS coordinates. In some embodiments, the reminder application uses the location field to display the reminder when a computing device that executes the reminder application is at or near the location. Here, the location condition is also associated with a repeat field that defines whether the reminder is repeated each time the computing device is at or near the location.

One of ordinary skill in the art will recognize that data structures 1205, 1210, 1215, and 1220 are just example data structures that can be modified in various different ways. For example, different embodiments might store additional or less information, store the information in a different order, etc. In addition, the application of some embodiments stores other types of information, such as flags to indicate whether an "AND" condition need to be satisfied, or and "OR" condition need to be satisfied. In addition, although the weather condition data structure 1205 is shown as being separate from the reminder data structure 1210, it may be a part of reminder data structure, in some embodiments.

V. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. In addition, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 13:
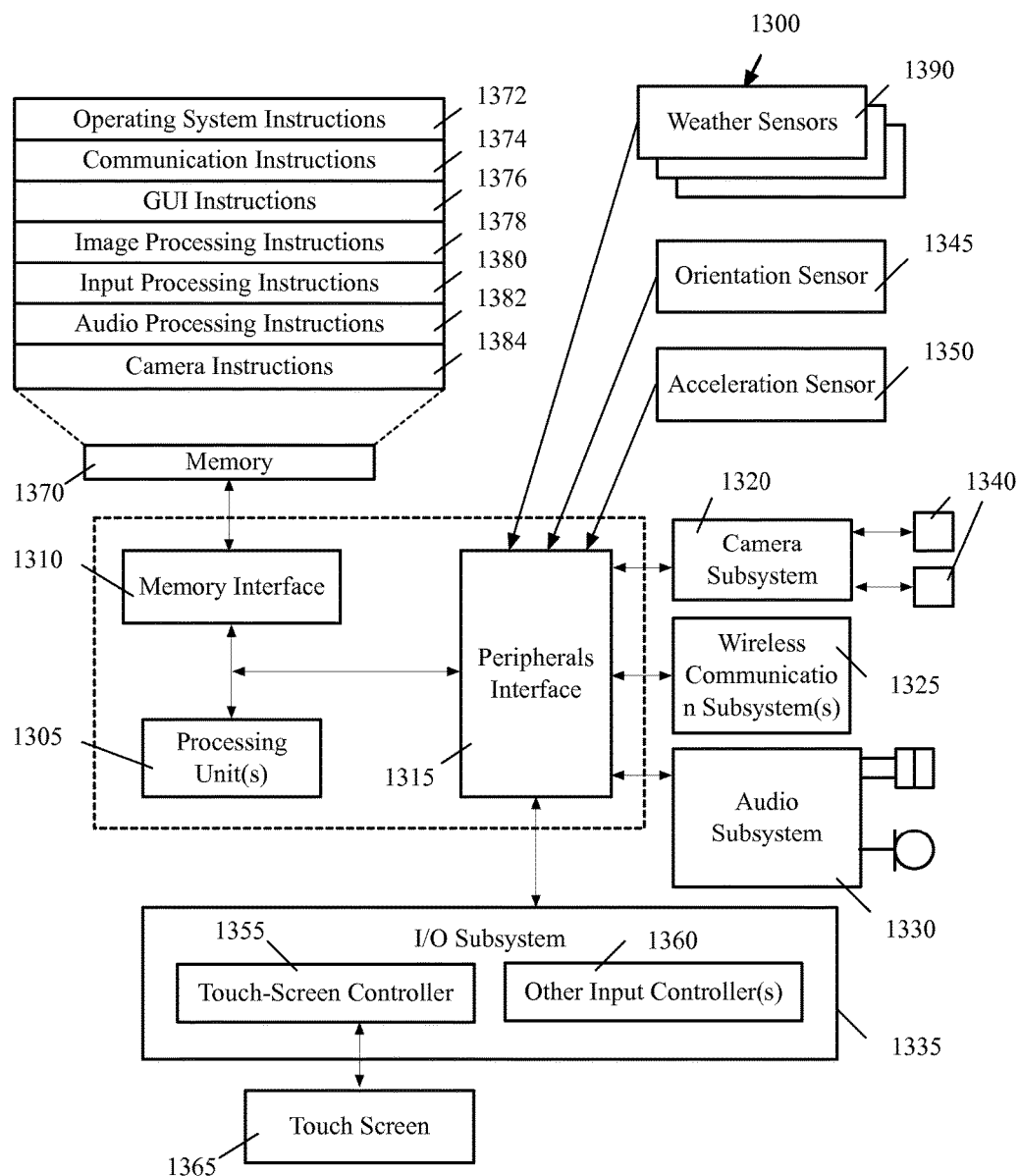
FIG. 13 is an example of an architecture a mobile computing device of some embodiments.

The reminder application of some embodiments operates on mobile devices. FIG. 13 is an example of an architecture 1300 of such a mobile computing device. Examples of mobile computing devices include smartphones, tablets, laptops, etc. As shown, the mobile computing device 1300 includes one or more processing units 1305, a memory interface 1310 and a peripherals interface 1315.

The peripherals interface 1315 is coupled to various sensors and subsystems, including a camera subsystem 1320, a wireless communication subsystem(s) 1325, an audio subsystem 1330, an I/O subsystem 1335, etc. The peripherals interface 1315 enables communication between the processing units 1305 and various peripherals. For example, an orientation sensor 1345 (e.g., a gyroscope) and an acceleration sensor 1350 (e.g., an accelerometer) is coupled to the peripherals interface 1315 to facilitate orientation and acceleration functions. The Weather Sensors 1390 is coupled to the peripherals interface 1315 to facilitate the generation of weather data from locally measured conditions. For example, the weather sensors 1390 can include a thermometer for measuring temperature, a barometer for measuring pressure, a humidity sensor, or a wind sensor. Other embodiments include other weather sensors.

The camera subsystem 1320 is coupled to one or more optical sensors 1340 (e.g., a charged coupled device (CCD) optical sensor, a complementary metal-oxide-semiconductor (CMOS) optical sensor, etc.). The camera subsystem 1320 coupled with the optical sensors 1340 facilitates camera functions, such as image and/or video data capturing. The wireless communication subsystem 1325 serves to facilitate communication functions. In some embodiments, the wireless communication subsystem 1325 includes radio frequency receivers and transmitters, and optical receivers and transmitters (not shown in FIG. 13). These receivers and transmitters of some embodiments are implemented to operate over one or more communication networks such as a GSM network, a Wi-Fi network, a Bluetooth network, etc. The audio subsystem 1330 is coupled to a speaker to output audio. Additionally, the audio subsystem 1330 is coupled to a microphone to facilitate voice-enabled functions, such as voice recognition, digital recording, personal digital assistants, audio dictation of reminders and reminder conditions etc.

The I/O subsystem 1335 involves the transfer between input/output peripheral devices, such as a display, a touch screen, etc., and the data bus of the processing units 1305 through the peripherals interface 1315. The I/O subsystem 1335 includes a touch-screen controller 1355 and other input controllers 1360 to facilitate the transfer between input/output peripheral devices and the data bus of the processing units 1305. As shown, the touch-screen controller 1355 is coupled to a touch screen 1365. The touch-screen controller 1355 detects contact and movement on the touch screen 1365 using any of multiple touch sensitivity technologies. The other input controllers 1360 are coupled to other input/control devices, such as one or more buttons. Some embodiments include a near-touch sensitive screen and a corresponding controller that can detect near-touch interactions instead of or in addition to touch interactions.

The memory interface 1310 is coupled to memory 1370. In some embodiments, the memory 1370 includes volatile memory (e.g., high-speed random access memory), non-volatile memory (e.g., flash memory), a combination of volatile and non-volatile memory, and/or any other type of memory. As illustrated in FIG. 13, the memory 1370 stores an operating system (OS) 1372. The OS 1372 includes instructions for handling basic system services and for performing hardware dependent tasks.

The memory 1370 also includes communication instructions 1374 to facilitate communicating with one or more additional devices; graphical user interface instructions 1376 to facilitate graphic user interface processing; image processing instructions 1378 to facilitate image-related processing and functions; input processing instructions 1380 to facilitate input-related (e.g., touch input) processes and functions; audio processing instructions 1382 to facilitate audio-related processes and functions; and camera instructions 1384 to facilitate camera-related processes and functions. The instructions described above are merely exemplary and the memory 1370 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 13 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 13 may be split into two or more integrated circuits.

B. Computer System

Figure 14:
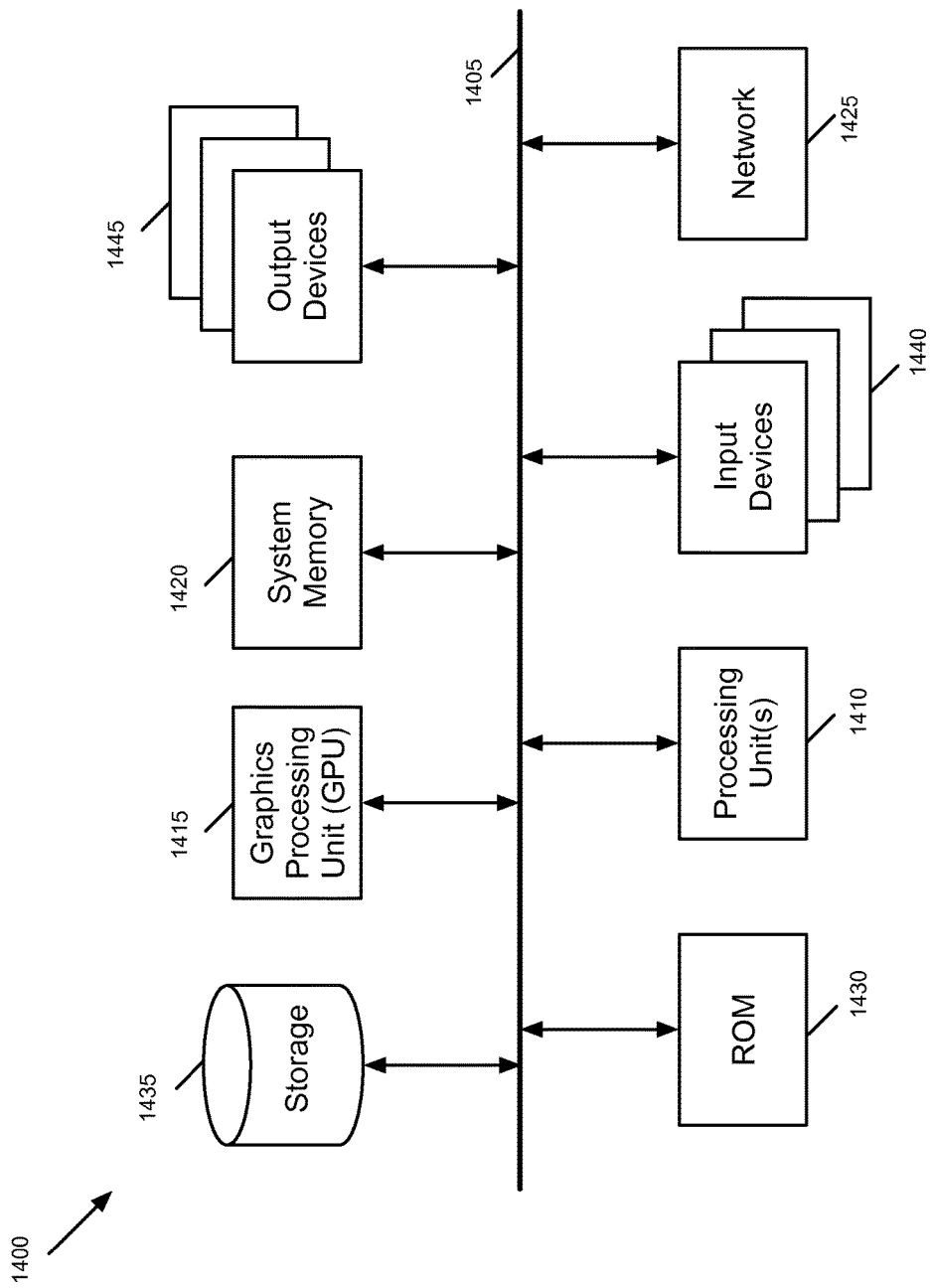
FIG. 14 conceptually illustrates another example of an electronic system with which some embodiments of the invention are implemented.

FIG. 14 conceptually illustrates another example of an electronic system 1400 with which some embodiments of the invention are implemented. The electronic system 1400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1400 includes a bus 1405, processing unit(s) 1410, a graphics processing unit (GPU) 1415, a system memory 1420, a network 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the GPU 1415, the system memory 1420, and the permanent storage device 1435.

From these various memory units, the processing unit(s) 1410 retrieves instructions to execute and data to process in order to execute the processes of the invention. The processing unit(s) may be a single processor or a multi-core processor in different embodiments. Some instructions are passed to and executed by the GPU 1415. The GPU 1415 can offload various computations or complement the image processing provided by the processing unit(s) 1410.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash memory device, etc., and its corresponding drive) as the permanent storage device. Like the permanent storage device 1435, the system memory 1420 is a read-and-write memory device. However, unlike storage device 1435, the system memory 1420 is a volatile read-and-write memory, such a random access memory. The system memory 1420 stores some of the instructions and data that the processor needs at runtime. In some embodiments, the invention's processes are stored in the system memory 1420, the permanent storage device 1435, and/or the read-only memory 1430. For example, the various memory units include instructions for processing multimedia clips in accordance with some embodiments. From these various memory units, the processing unit(s) 1410 retrieves instructions to execute and data to process in order to execute the processes of some embodiments.

The bus 1405 also connects to the input and output devices 1440 and 1445. The input devices 1440 enable the user to communicate information and select commands to the electronic system. The input devices 1440 include alphanumeric keyboards and pointing devices (also called "cursor control devices"), cameras (e.g., webcams), microphones or similar devices for receiving voice commands, etc. The output devices 1445 display images generated by the electronic system or otherwise output data. The output devices 1445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 2 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, one of ordinary skill in the art will understand that many of the UI items of in FIGS. 1, 3-5, and 7-10 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A non-transitory machine readable medium storing a reminder application that when executed by at least one processing unit provides a graphical user interface ("GUI"), the GUI comprising:

a reminder editing tool for inputting a weather-based reminder in terms of (i) a set of weather-based conditions comprising a weather type and a location of the weather condition, (ii) an operator that specifies whether all of the weather-based conditions have to be met or only one of the weather-based conditions has to be met before a notification associated with the reminder is presented, and (iii) a set of reminder content to be presented as part of the reminder;

a weather condition tool for gathering weather data for the location; and a set of notification tools for presenting the notification and the reminder content as an alert when the gathered weather data for the location satisfies the set of weather-based conditions according to the operator.

2. The non-transitory machine readable medium of claim 1, wherein the set of weather-based conditions further comprises a duration of the weather condition, wherein the GUI further comprises a time condition tool for specifying the duration of the weather condition.

3. The non-transitory machine readable medium of claim 1, wherein the GUI further comprises a location condition tool for specifying the location of the weather condition for the reminder.

4. The non-transitory machine readable medium of claim 3, wherein the reminder application executes on a portable device, wherein the notification associated with the reminder is only presented when the portable device is at or near the location.

5. A non-transitory machine readable medium of a mobile device that comprises a user interface, at least one processing unit, and a display screen, the non-transitory machine readable medium storing a program for execution by the processing unit, the program comprising sets of instructions for:

through the mobile device's user interface, receiving input to create a reminder that triggers on a weather condition for a location, the input to create the reminder comprising content to be presented along with the reminder;

based on the input, creating and storing the reminder;

repeatedly checking with a weather server to obtain weather data for the location; and when the obtained weather data satisfies the weather condition, presenting the reminder with the reminder content on the display screen as an alert;

wherein the reminder content is a media clip.

6. A non-transitory machine readable medium of a mobile device that comprises a user interface, at least one processing unit, and a display screen, the non-transitory machine readable medium storing a program for execution by the processing unit, the program comprising sets of instructions for:

through the mobile device's user interface, receiving input to create a reminder that triggers on a weather condition for a location, the input to create the reminder comprising content to be presented along with the reminder;

based on the input, creating and storing the reminder;

repeatedly checking with a weather server to obtain weather data for the location; and when the obtained weather data satisfies the weather condition, presenting the reminder with the reminder content on the display screen as an alert;

wherein the reminder content is a graphical image.

* * * * *